United States Patent
Zhang et al.

(10) Patent No.: US 10,938,688 B2
(45) Date of Patent: Mar. 2, 2021

(54) NETWORK COSTS FOR HYPER-CONVERGED INFRASTRUCTURES

(71) Applicant: VMware, Inc., Palo Alto, CA (US)

(72) Inventors: Bolt Zhang, Beijing (CN); Wenyu Zhang, Beijing (CN); Sahan Gamage, San Jose, CA (US); Wang Qiong, Beijing (CN); Hua Wang, Beijing (CN); Lei Lu, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 98 days.

(21) Appl. No.: 16/041,939

(22) Filed: Jul. 23, 2018

(65) Prior Publication Data

US 2020/0028764 A1 Jan. 23, 2020

(51) Int. Cl.
*H04L 12/26* (2006.01)
*G06F 9/455* (2018.01)

(52) U.S. Cl.
CPC .......... *H04L 43/08* (2013.01); *G06F 9/45558* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,544,368 B2* | 1/2017 | Baker | H04L 67/1095 |
| 2011/0007746 A1* | 1/2011 | Mudigonda | G06F 9/45558 370/395.21 |
| 2011/0119388 A1* | 5/2011 | Attanasio | G06F 9/5055 709/227 |
| 2014/0223122 A1* | 8/2014 | Butt | G06F 9/5088 711/162 |
| 2014/0301192 A1* | 10/2014 | Lee | H04L 47/10 370/230 |
| 2016/0036893 A1* | 2/2016 | Pomerantz | H04L 47/70 709/201 |
| 2016/0103699 A1* | 4/2016 | Thakkar | G06F 9/45558 718/1 |
| 2017/0068557 A1* | 3/2017 | Cropper | G06F 9/45558 |
| 2017/0220394 A1* | 8/2017 | Shim | G06F 9/45558 |
| 2018/0095776 A1* | 4/2018 | Tsai | G06F 9/5083 |
| 2018/0095787 A1* | 4/2018 | Oechsner | H04W 36/22 |
| 2018/0205612 A1* | 7/2018 | Rao | G06F 11/20 |

OTHER PUBLICATIONS

Stroud, Forrest. "Hyper-convergence". Posted at https://www.webopedia.com/TERM/H/hyper-converged-infrastructure.html on Jan. 23, 2018. (Year: 2018).*

* cited by examiner

*Primary Examiner* — Scott B Christensen
(74) *Attorney, Agent, or Firm* — Thomas | Horstemeyer LLP (57) ABSTRACT

Systems and methods for reducing network cost in a hyper-converged infrastructure are disclosed. The network cost of workload pairs can be assessed. Migration of the workloads can be considered to reduce the network cost and improve the network efficiency of the hyper-converged infrastructure.

21 Claims, 4 Drawing Sheets

NETWORK COSTS FOR HYPER-CONVERGED INFRASTRUCTURES

BACKGROUND

A hyper-converged infrastructure can provide an enterprise with modular and expandable compute, memory, storage, and network resources as well as system backup and recovery. In a hyper-converged infrastructure, compute, memory, storage, and network resources are brought together using preconfigured and integrated hardware. Tasks can be allocated to hardware that is capable of performing the allotted task. When a task requires more resources, additional hardware can be assigned to the task, for example, using virtualization software.

Tasks, such as applications or virtual machines, can be allocated across a fleet of physical machines in a cluster of machines by a resource scheduler. The resource scheduler can allocate and balance computing capacity across machines that are aggregated into logical resource pools. Traditionally, resource schedulers can distribute workloads across hardware resources by balancing CPU and memory usage across a cluster of machines. In certain scenarios, network usage between the workload and external networks can also be considered. However, network communications between workloads within a cluster of machines is also a significant resource metric that can affect the scalability and efficiency of services that are implemented within a computing environment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to placement of workloads, such as virtual machines or applications, within a hyper-converged infrastructures and other infrastructures for providing compute, memory, storage, and network resources that are brought together using integrated hardware. For example, in the case of virtual machines that are deployed within a hyper-converged infrastructure, virtual machine (VM) placement across the physical resources of the infrastructure is a powerful technique to improve the scalability and efficiency of data center in which the workloads are deployed.

Examples of this disclosure provide a network-aware cost based VM placement framework. Implementations can take into account the pairwise traffic between workloads that are executing on one or more physical host devices within an infrastructure and reflects the real network cost of a data center. Workloads can include virtual machines or applications that are executed on host devices, or computing devices, that are deployed within a hyper-converged infrastructure. Workload pairs can be ranked or sorted by network traffic volume as well as a network cost of the network traffic. One or both workloads in a pair having a high network cost or traffic volume can be relocated to other host devices within the infrastructure to minimize the network cost of the network traffic. In one example, the framework disclosed herein can be integrated with VMware Distributed Resource Scheduler (DRS), which can perform migration of workloads.

According to some examples, program instructions can be executed in at least one computing device, which can include at least one of a plurality of hosts within a hyper-converged infrastructure (HCI). Switches, like top-of-rack (TOR) switches, other rack-integrated switches, middle-of-row switches, and end-of-row switches can also be included, as well as computing devices that are external to, or otherwise not within the hyper-converged infrastructure. Routers that route network traffic between switches can also be contemplated. Network traffic associated with workloads within the HCI can be monitored. More specifically, the volume of network traffic between pairs of workloads can be monitored and tracked. Those workload pairs having a high volume of network traffic and a high network cost can be considered candidates for migration.

A network cost can be expressed in terms of a network distance that is traversed between the two workloads in a pair. A network cost can also be expressed in terms of a number of hops that traffic must take in order to traverse between two workloads. Workloads that are executed on the same host device can be considered to have a low network cost. In this scenario, network traffic between the two workloads doesn't involve other physical devices in the HCI, such as network switches or routers. Workloads that are executed on separate host devices can have a relatively higher network cost because network traffic between the two workloads might require traversing a hardware switch. Network traffic for some workload pairs that are executed on different host devices might require traversing a hardware switch and a router, so this network traffic can be assigned an even higher network cost.

In a software defined network environment, logical switches can be implemented across one or more host devices. A logical switch represents a network switch implemented in software. In some cases, a logical switch is implemented across multiple host devices. In this scenario, network traffic that traverses multiple host devices has to traverse a physical switch.

Accordingly, once traffic volume between pairs of workloads with an HCI is assessed, migration of workloads can be undertaken to make the HCI operate more efficiently from a network cost point of view. Iteration based algorithms can select a workload from a workload pair for migration at a given iteration with a greedy selection policy. The greedy minimax algorithm can ensure the reduction of the network cost in the HCI.

Regardless of the selection algorithm that is used, embodiments of the disclosure can collect network traffic information between pairs of workloads, understand the network topology or network cost for traffic to be exchanged between workloads, identify workload pairs having a high volume of exchanged network traffic, and propose or perform migration of workloads to reduce the network cost of the HCI.

Figure 1:
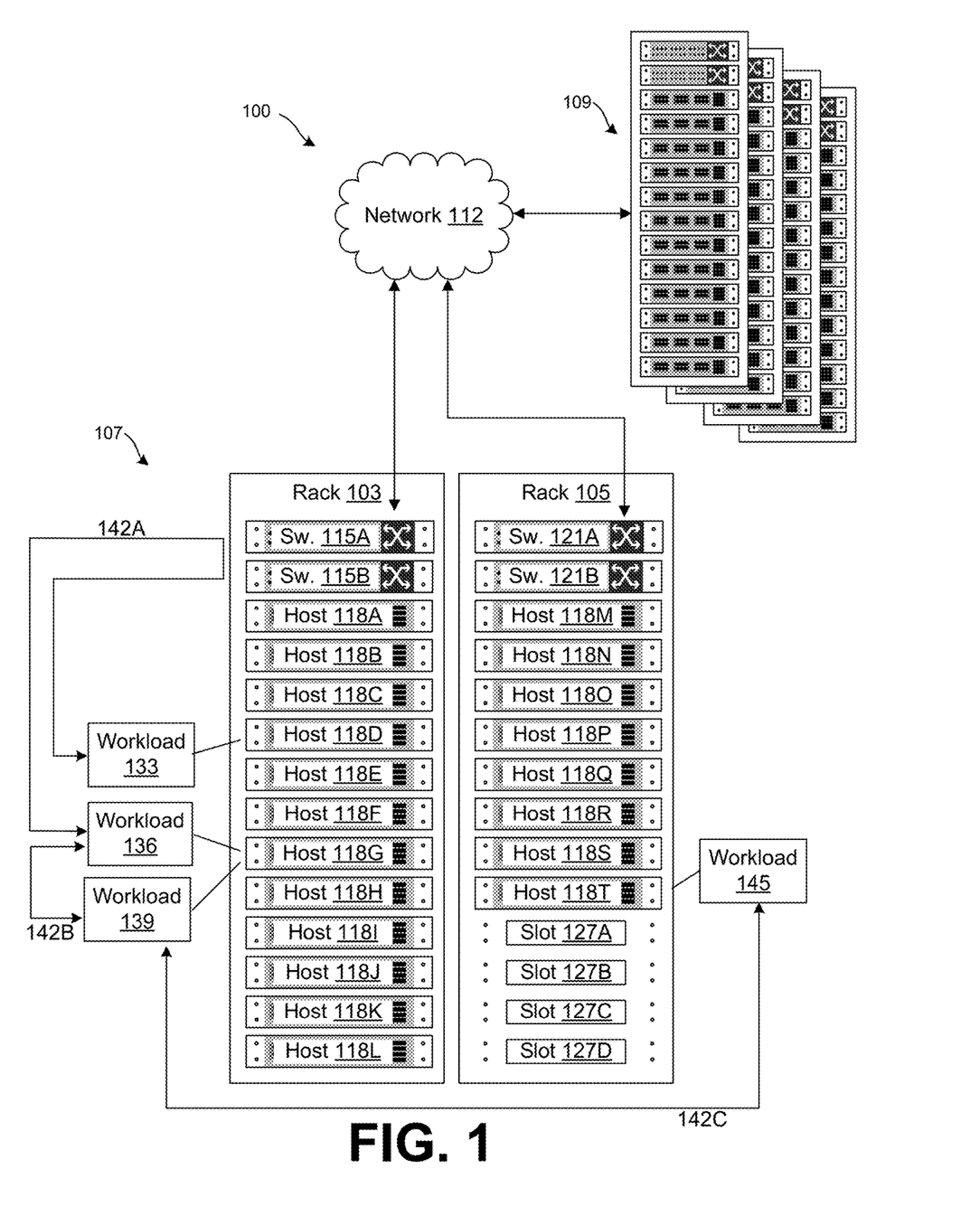
FIG. 1 is a drawing of an example of a networked environment including components connected through a network.

With reference to FIG. 1, shown is an example of a networked environment 100. The networked environment 100 can have components including racks 103 and 105 of a site 107, and additional racks of a site 109, in communication with one another over a network 112. The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks. The network 112 can also include switches, routers, and other network devices. The network devices can include network devices that are held or integrated within racks and network devices that are external to the racks.

In some cases, the rack 103 can be a rack that is part of a hyper-converged infrastructure having compute, memory, storage, and network resources that are provided using integrated and/or preconfigured hardware. In other cases, a rack can be part of a converged infrastructure or another type of infrastructure. The rack 103 can have a preconfigured number of switches, or a preconfigured number of slots for switches or other network devices. For example, the rack 103 can have switches 115A and 115B. The switches 115A and 115B can be top-of-rack switches or other integrated network devices of the rack 103. While not shown, the switches 115 can also be further connected to other switches and network devices of the site 107 including spine switches, End-of-Row switches, Middle-of-Row switches, or other switches, routers, and the like. The switches 115 can also be connected to routers, which can route traffic between racks or between sites. The rack 103 can also include a number of hosts, or a preconfigured number of slots or bays for hosts.

For example, the rack 103 can have hosts 118A-118L (collectively, "hosts 118"). Where the rack 103 is part of a hyper-converged infrastructure, each of the hosts 118 can provide compute, memory, storage, and network resources. Each of the hosts 118 can be connected to the network 112 through the switches 115A and 115B. For example, the host 118 can include two network interface cards (NICs) connected to the switches 115A and 115B. Individual ones of the hosts 118 can be connected to both a port of the switch 115A and a port of the switch 115B. While the hosts 118 are connected to the network 112 through the switches 115A and 115B, the switches 115A and 115B can be considered a part of the network 112, as can network cards or controllers of the individual hosts.

Similarly, the rack 105 can also include a number of hosts, or a preconfigured number of slots or bays for hosts. For example, the rack 105 can have hosts 118M-118T as well as slots 127A-127D (slots 127). The slots 127 can accommodate or accept additional hosts to expand the compute, memory, storage, network, and other resources provided by the rack 105. Where the rack 105 is part of a hyper-converged infrastructure, each of the hosts 118 can provide compute, memory, storage, and network resources. Where the rack 105 is part of a hyper-converged infrastructure, each of the hosts 118 can provide compute, memory, storage, and network hardware. Each of the hosts 118 can be connected to the network 112 through the switches 121A and 121B. For example, individual ones of the hosts 118 can be connected to both a port of the switch 121A, and a port of the switch 121B. The switches 121A and 121B can be considered a part of the network 112, as can network cards or controllers of the individual hosts.

For example, each of the hosts 118, or host devices, can be a processor-based system, such as a computer system, and can include at least one computing device, at least one storage device, and at least one network device. While referred to in the singular for clarity, multiple computing devices, storage devices, and network devices can be included in each host. The computing device can include a processor circuit, such as one that includes a processor and a memory. The storage devices can include memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. The network devices can include network interface controllers or NICs switches, routers, and other network devices. The hosts can be utilized to perform or execute instructions, including processes, programs, applications, and other tasks that can be utilized in concert, for example, using software like the software defined datacenter (SDDC) manager 203, VMware vSphere®, vSAN®, NSX®, ESX®, ESXi®, and other virtualization software or tools.

The rack 103 and the rack 105 can be part of the site 107, which can be considered a local site. Additional racks can be provided at the site 109, which can be considered a remote site. In some cases, one or more of the sites can be provided by a service that provides compute, memory, storage, network, and other resources to an enterprise or another customer of the service. In other cases, one or more of the sites can also be owned or operated by the enterprise.

Software instructions can provide and assign resources using containers called workload domains. A workload domain can be a workload that is a physical collection of compute, memory, storage, and network resources that provide uniform characteristics to applications and tasks such as security, data protection, performance, availability, and modular expandability. A workload domain can perform or execute tasks, including applications, programs, and other instructions. Workload domains can provide a virtual machine for a user, infrastructure as a service (IaaS), platform as a service (PaaS), desktop as a service (DaaS)/virtual desktop infrastructure (VDI), or other compute tasks. These can be considered workload domain types, and workload domain types can further include test and development workload domain types, production workload domain types, and other domain types that can include any of these services or a combination of these and other services. Each domain type can be associated with a particular set of policies, settings, and capabilities for the workload domain. While an established workload domain can be assigned any desired task, workload domains can have a particular purpose or usage characteristics. In other words, there can be various types of workload domains. During the creation of workloads, the application or task requirements of the workload can be translated, for example, by the SDDC manager 203, to physical infrastructure requirements including a number of hosts to assign to the workload, each having compute, memory, storage, and network devices. The applications, tasks or other functionalities can be performed or brought up on the chosen hardware.

For example, types of workload domains can include production workload domains, test and development workload domains, management workload domain or management cluster, disaster recovery workload domains, and others. Each type of workload domain can be assigned a particular priority, such that one type of workload domain is a lower priority than another workload. Each type of workload domain can also be assigned a particular expected bandwidth. Workload domain priority can be assigned, for example, as high-priority, low-priority, a numerical or other value-based priority. The priority of workload domains can be compared to other workload domains, and the lowest-priority workload domains can be throttled if throttling becomes necessary in order to maintain network resource availability for higher-priority workload domains. Moreover, individual workload domains of any type can be set to a particular priority to meet the needs of an enterprise.

A production workload domain can, for example, be used for providing virtual desktop infrastructure (VDI). Users can access typical desktop environments, operating systems, applications, and the like. Production workload domains can be high-priority and can require dedicated bandwidth, or fewer network interruptions, to provide the best customer experience. It should be noted that while production workload domains can be high-priority workload domains, priority of a workload domain can be set to any level of priority. Some production workload domains can be higher than other production workload domains, or a customer may desire to set a certain production workload domain as a low-priority workload as compared to other types of workloads. Production workload domains can be assigned to hosts that are relatively nearby to target users, for example, on-site with target users, or at a remote site having a high-quality network connection for target users.

A test and development workload domain can, for example, be used for providing Infrastructure as a Service (IaaS), Software as a Service (SaaS), and other services and tasks for test and development. For example, test and development workload domains can provide an environment with infrastructure components, storage solutions, and applications for test and development, as well as handle tasks including system maintenance and software execution. While test and development workload domains can be assigned any desired priority, these domains can generally be regarded as a lower priority than production workload domains.

A disaster recovery workload domain can provide IaaS, SaaS, and other services and tasks for disaster recovery. For example, disaster recovery workload domains can provide an environment with infrastructure components, storage solutions, and applications for disaster recovery, temporary or permanent replacement of other workload domains, recovery of other workload domains, system maintenance, and the like. While disaster recovery workload domains can be assigned any desired priority, these domains can generally be regarded as a lower priority than production workload domains. However, since disaster recovery workload domains can be used for temporary or permanent replacement for production workload domains, once reassigned, they may assume or be reassigned to the priority of the workload domain that they are replacing.

A management workload domain can be used for providing software defined data center (SDDC) functionality. The SDDC functionality can be provided through policy-based data center management software. The SDDC functionality can allow administrators to centrally monitor and administer all workload domains, applications, and tasks across individual sites or multiple sites, including local hardware, private cloud, public cloud, and hybrid cloud deployments. Administrators can deploy and manage workload domains in physical, virtual, and cloud environments with a unified management experience through a management workload domain executing SDDC functionality. Management workload domains can also be referred to as a management cluster. While a management workload domain can be assigned any desired priority, it can generally be regarded as a high-priority workload domain.

These types of workload domains are illustrative, and any type or naming convention can be used for types of workload domains. For example, new workload domains can be assigned to a particular preconfigured workload domain type, or a user-created custom workload domain type. Also, existing workload domains can execute particular applications, and can be assigned to a type after they are initially established by analysis of the applications and tasks performed by the particular workload domain, for example, if they match a profile of a particular preconfigured workload domain type or a user-created custom workload domain type. While certain functionalities are discussed regarding particular types of workload domains, any of the functionalities and applications can also be provided by these and other workload domains. For example, internet of things (IoT) functionalities, AirWatch® functionalities, VMware® Photon OS, and other functionalities and application types can be provided. During the creation of workload domains, the applications and tasks to be performed can be translated to physical infrastructure requirements including compute, memory, storage, and network requirements. In some cases, the applications and tasks performed and the compute, memory, storage, and network requirements can be used to determine a particular host to assign to the workload domain at creation.

A single physical rack can support multiple workload domains. Also, a single workload domain can be assigned hosts from multiple different physical racks, and hosts from multiple sites or locations. For example, any of the hosts 118 or hosts of the remote site 109 can be assigned to a workload domain. A single workload domain can be assigned to multiple hosts 118 of the rack 103. Alternatively, a single workload domain can be assigned a host from the rack 103, a host from the rack 105, and a host from the remote site 109. It should be noted that in some cases, the site 107 can be a private cloud site, and the remote site 109 can be a public cloud site, such that the networked environment 100 can be considered a hybrid cloud environment. In other cases, each of the sites 107 and 109 can be private, or each of the sites 107 and 109 can be public.

Referring back to FIG. 1, the hosts 118D and 118G can be assigned to workloads 133, 136, and 139, respectively. In other words, these workloads can be executed on host devices within the HCI. In one example, these workloads 133, 136, and 139 can represent virtual machines or applications that are executed on the hosts 118. To facilitate execution of virtual machines, the hosts 118 can execute a hypervisor and other applications that services that allow for execution and management of virtual machines on the hosts 118. In one example, a management cluster 130 can be executed on one or more of the hosts within a rack 103 that can monitor network traffic between workloads implemented on the hosts 118.

The physical hosts 118A-118C can be connected to the network 112 through the switches 115A or 115B. Accordingly, in one implementation, the hosts 118A-118C can be connected to a port of the switch 115A and to a port of the switch 115B. The functionalities provided through the management cluster 130 can monitor and analyze network traffic 142 including network traffic 142A to and from the hosts 118 through the switches 115 as well as the network traffic 142B that may not traverse a switch.

In the example of FIG. 1, network traffic 142A between a workload pair that includes workloads 133 and 136 might traverse a switch 115 and have a higher network cost that network traffic 142B between a workload paid that includes workloads 136 and 139 might not traverse a switch 115 and thus is assigned a lower network cost. Network traffic 142C between a workload pair that includes workloads 139 and 145 might traverse a switch 115 and a router, which can be assigned an even higher network cost than network traffic 142A. Accordingly, embodiments of the disclosure can identify workload pairs and analyze network traffic 142 to make determinations about where workloads should be placed within a HCI to minimize network cost.

Figure 2:
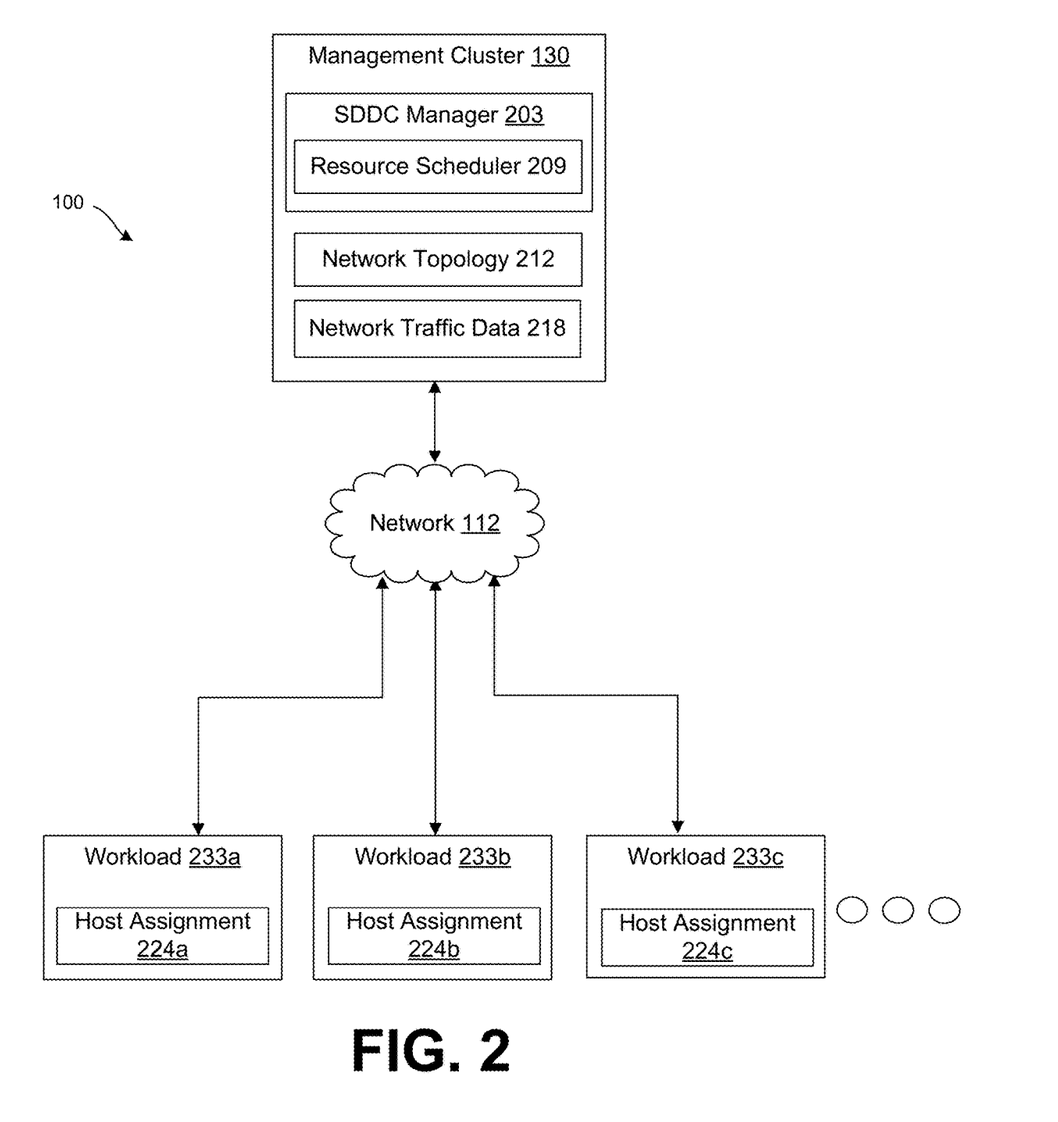
FIG. 2 is a drawing further illustrating components of the networked environment including a management cluster and workload domain components connected through the network.

Referring to FIG. 2, shown is an example of components of the networked environment 100 in communication through the network 112. The management cluster 130 represents an application or service that can be executed on a host device to manage and oversee the operation of a software defined datacenter. In one example, the management cluster 130 can execute an SDDC manager 203. VMware vSphere®, vSAN®, NSX®, ESX®, ESXi®, DRS®, and other virtualization software and tools can also be executed in the management cluster 130 and the various hosts, and can work in concert with, and can be considered part of, the SDDC manager 203. The SDDC manager 203 can allow administrators to centrally monitor and administer all workloads, workload domains, applications, and tasks across individual sites or multiple sites, including local hardware, private cloud, public cloud, and hybrid cloud deployments. SDDC manager 203 can also allow administrators to manage and deploy logical hardware resources, such as logical switches and logical routers that are implemented on host devices within a software defined datacenter.

Administrators can deploy and manage workload domains in physical, virtual, and cloud environments with a unified management experience through at least one user interface generated by management cluster 130 executing the SDDC manager 203. For example, administrators can create new workload domains through the user interface of the SDDC manager 203. Additionally, hosts can be manually assigned and shifted within the available hosts through the user interface of the SDDC manager 203. Administrators can configure and change properties, settings, and other configurations for particular workload domains. For example, a particular workload domain can be configured to have a certain priority, such as a low-priority workload domain setting or a high-priority workload domain setting. A particular workload domain can be further manually set to have a particular expected bandwidth requirement.

The SDDC manager 203 can monitor and analyze network traffic 142 including network traffic 142 to and from the hosts 118 through the switches 115, routers, or other physical and local network devices that are in the HCI. The SDDC manager 203 can also identify which workloads are exchanging network traffic and track the volume of data exchanged between workloads within the HCI. Because an administrator can configure the HCI using the SDDC manager 203, the SDDC manager 203 can also be configured with a mapping or topology of the network of the HCI. Accordingly, the SDDC manager 203 can determine how many network hops occur between workloads within the SDDC for the purpose of determining the network cost of traffic exchanged between workload pairs. Accordingly, the SDDC manager 203 can store the network topology 212 associated with the HCI in a data store or in-memory. The network topology 212 can identify the workloads 233 within the HCI, the network devices within the HCI, and how the workloads 233 are connected within the HCI. To this end, the network topology 212 can identify on which host device 118 or devices within the HCI that a particular workload is executed. The network topology 212 can also identify to which network switches or routers that a host device 118 or rack within the HCI is connected. The network topology 212 can be determined from a configuration setup by an administrator or through a network analysis process that creates a map of the network in which the HCI is situated.

The management cluster 130 can also store network traffic data 218 in a data store of the management cluster 130. The network traffic data 218 can be gathered or logged by the SDDC manager 203 or another service. The network traffic data 218 can be collected from hosts 118 within the HCI as well as hypervisors executing on the hosts 118. In one example, the hosts 118 can submit simple network management protocol (SNMP) reports to the SDDC manager 203 or a collector service that collects network traffic data from the hosts 118. Additionally, hypervisors executed by the hosts 118 can also submit traffic reports to the SDDC manager 203 or a collector service. The traffic reports from the hypervisors can identify workload 233 network traffic. In some cases, traffic reports can comprise NetFlow or Internet Protocol Flow Information Export (IPFIX) reports.

The network traffic data 218 can include network traffic data based on network traffic 142 between workloads and nodes external to the HCI, switch data for each of the switches 115 and 121, router data for any routers within the HCI, host data for each of the hosts 118, and other data. The switch data can represent network traffic that traverses a particular physical switch. For example, the switch data can include measured usage statistics including available transmit buffer and receive buffer in each switch port, switch store and forward buffers used, and pause frames received. The host data can include actual bandwidth usage including current and average bandwidth usage for each of the hosts within the HCI. The host data can include the settings and configurations of each of the workloads executed on the hosts 118 as well as network settings and configurations of a hypervisor process on which workloads are executed. The network traffic data 218 can include a volume of network traffic that is exchanged between workloads 233 within the HCI.

Workloads 233 can represents virtual machines or applications executed on host devices within the HCI. Workloads 233 can be executed on a host device that runs a hypervisor that facilitates access to the physical resources of the host device by workloads 233 running atop the hypervisor. For example, VDI functionalities, IaaS functionalities, SaaS functionalities, IoT functionalities, VMware® Photon OS, AirWatch®, and other functionalities and application types can be provided by executing workloads 233 on hosts. Each workload 233 can have a host assignment 224 that identifies which host 118 within the HCI on which the workload 233 is executed.

The SDDC manager 203 can analyze the network traffic data 218 to assign hosts to a workload 233. The SDDC manager 203 analyze the network traffic data 218 to identify pairs of workloads 233 that are exchanging network traffic 142 over a particular period of time. The workload pairs can be ranked according to a volume of network traffic 142 exchanged between the workloads. A network cost associated with the network traffic 142 or the network distance between the workloads 233 can be determined. Then, the workloads 233 can be migrated to other hosts 118 to minimize network cost.

To determine a network distance between workloads 233, a distance value can be assigned to a particular workload pair. For example, if both workloads in a pair are executing on the same host, the network distance can be considered small, or a 1. If the workloads are on the same or common subnetwork but are executing on different hosts 118 so that network traffic must traverse a switch 115 or 121, the network distance can be considered larger, or a 2. Next, if the workloads are on different subnetwork so that network traffic 142 between the workloads 233 must traverse a switch and a router, the network distance is even larger, or a 3. The numbers assigned to network distance above are merely exemplary and for the sake of illustration.

In some instances, a workload pair can be in communication over a virtual distributed switch that is implemented on a host 118 in which both workloads 233 are executed. In this scenario, the network traffic 142b between the two workloads 233 does not traverse a switch or a router. In other instances, a workload pair can be in communication over a virtual distributed switch that is implemented on more than one host 118. In this scenario, if the workloads 233 are executed on different hosts 118, network traffic between the two workloads traverses a physical switch 115 or 121.

Additionally, because the network traffic data 218 includes the volume of network traffic 142 exchanged between workloads 233, the SDDC manager 203 can determine a cost associated with the network traffic of a workload pair. In one example, the SDDC manager 203 can analyze network traffic data 218 over a particular period of time. Over the analyzed time period, the SDDC manager 203 can rank workload pairs by a volume of network traffic exchanged between the workloads 233 in the pair. The SDDC manager 203 can then calculate a cost of the network traffic based on the volume.

For example, to calculate the cost between two workloads 233, the SDDC manager 203 can use the following equation:

$$Cost(Wx, Wy) = vol(x,y)*dist(x,y) + vol(y,x)*dist(y,x)$$

In the above equation, the cost between workloads x and y can be determined based on the volume of network traffic between the workloads and the network distance between the workloads as determined from the network topology 212. The exact calculation or values for cost can vary depending upon the implementation. In some implementations, the SDDC manager 203 can determine the cost of network traffic between all workload pairs or a subset of identified workload pairs, such as the highest ranked N workload pairs by network traffic volume.

Upon determining a cost of network traffic between workload pairs, the SDDC manager 203 can initiate migration of one or more workloads to another host device to lessen the overall network cost of the HCI. In one implementation, the SDDC manager 203 can employ a greedy selection algorithm to determine which workloads to migrate to another host device. In one scenario, the SDDC manager 203, for each workload 233 in the HCI, can identify a migration that results in the maximum network cost reduction. In another scenario, the SDDC manager 203 can only attempt to migrate one or both workloads 233 in a workload pair that is highly ranked in terms of network cost or network traffic volume.

As example of a greedy selection algorithm for workload migration is expressed in pseudocode as follows:

```
for each Wx in HCI do
    bestMigration = null
    maxGain = 0
    for each compatible host device z do
        Gain = calculateNetworkCostReduction(x->z)
```

```
        if Gain > maxGain then
            maxGain = Gain
            bestMigration = (x->z)
        endif
    endfor
    migrate(bestMigration)
```

In the above pseudocode, Wx refers to a particular workload 233 within the HCI, and the algorithm iterates through every host device that is capable or compatible with accepting the workload 233. As seen above, the algorithm can select the best migration to which to migrate each workload 233 within the HCI. In this context, a migration represents moving a workload 233 from its initial host 118 to a different host 118 that results in a reduced network cost to the system. In one implementation, the SDDC manager 203 can iterate through the workloads 233 by the ranking of a workload pair to which the workload 233 belongs in terms of network traffic or network cost.

Migration of a workload 233 to a different host device can be performed by the resource scheduler 209. The resource scheduler 209 can migrate the workload 233 and its respective data, settings, and configuration to a different host device on behalf of the SDDC manager 203.

Figure 3:
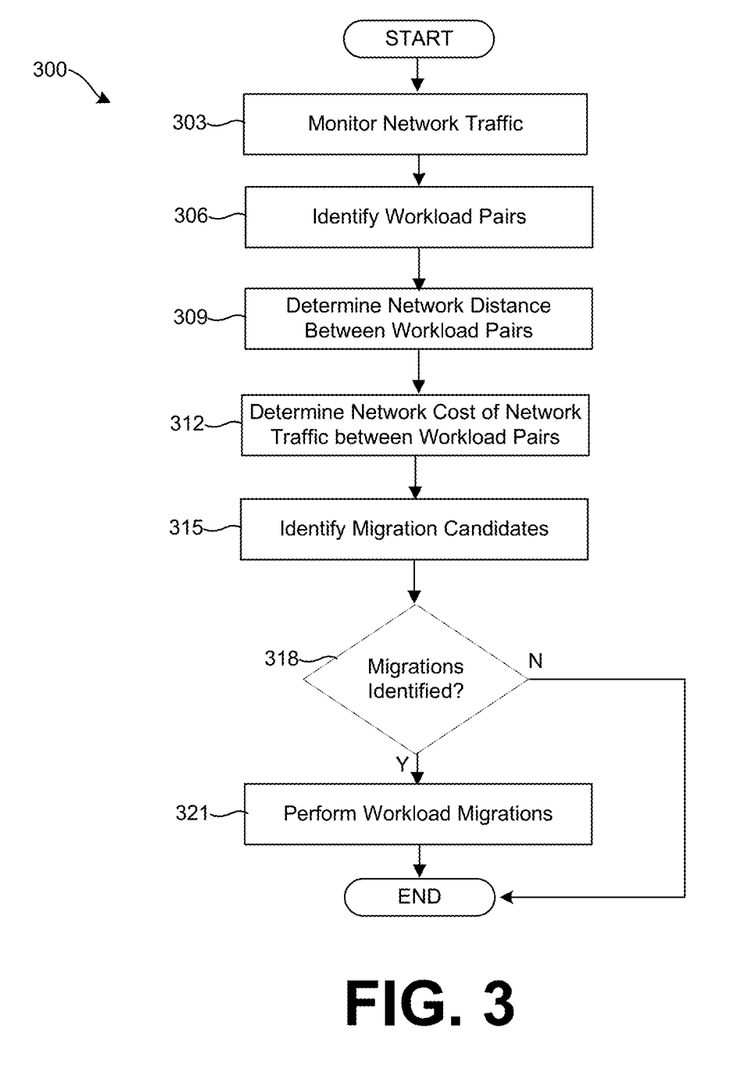
FIGS. 3-4 are example flowcharts illustrating functionalities implemented by components of the networked environment.

Referring to FIG. 3, shown is an example flowchart 300 describing steps that can be performed by the components of the networked environment 100 of FIG. 1. Generally, the flowchart 300 describes how the management cluster 130 executing the SDDC manager 203 can identify workload pairs and perform migrations of workloads to improve the network efficiency of a HCI managed by the SDDC manager 203. In some cases, some of the steps performed in FIG. 3 can be considered part of the resource scheduler 209 of the SDDC manager 203.

First, at step 303, the SDDC manager 203 can monitor network traffic 142 associated with workloads 233 in the HCI, including to and from the hosts 118 through the switches 115, routers, and between workloads 233 executed on the same host 118. The network traffic 142 can be stored as network traffic data 218 that is obtained from network reporting data from the hosts 118 as well as from hypervisor processes executed by the hosts 118. For example, a service executed by the hosts 118 can provide SNMP reports to the SDDC manager 203. The hypervisor can provide network reports associated with workloads 233 running atop the hypervisor to the SDDC manager 203. In some cases, workloads 233 can directly report network usage information to the SDDC manager 203.

At step 306, the SDDC manager 203 can identify workload pairs from the network reporting data 218. Workload pairs include two workloads 233 that exchange network traffic 142. The SDDC manager 203, in some implementations, can rank or sort workload pairs according to the volume of network traffic 142 exchanged between the workloads 233.

At step 309, the SDDC manager 203 can determine the network distance between workloads 233 within the identified workload pairs. The SDDC manager 203 can determine the network distance from the network topology 212 of the HCI. For example, if both workloads in a pair are executing on the same host 118, the network distance can be considered small because the network traffic need not leave host 118 to traverse between the workloads 223 in the pair. If the workloads are on the same or common subnetwork but are executing on different hosts 118 so that network traffic 142 must traverse a switch 115 or 121, the network distance can be considered larger. If the workloads are on different subnetwork so that network traffic 142 between the workloads 233 must traverse a switch and a router, the network distance is even larger.

At step 312, the SDDC manager 203 can determine a network cost of the volume of network traffic exchanged between workloads 233 in the identified workload pairs. In some cases, the SDDC manager 203 might only analyze the network traffic 142 between those workload pairs with the highest traffic volume. The SDDC manager 203 can use a formula or equation can be used to compute network cost of a particular volume of traffic that takes into account network distance. The cost factors used to calculate network cost can vary depending upon the implementation.

At step 315, the SDDC manager can identify migration candidates. The SDDC manager 203 can employ a greedy selection algorithm to determine which workloads to migrate to another host 118. In one scenario, the SDDC manager 203, for each workload 233 in the HCI, can identify a migration that results in the maximum network cost reduction. In another scenario, the SDDC manager 203 can only attempt to migrate one or both workloads 233 in a workload pair that is highly ranked in terms of network cost or network traffic volume. Further detail on identifying migration candidates is provided in the discussion of FIG. 4.

At step 318, the SDDC manager 203 can determine whether migration candidates were identified. In some scenarios, the SDDC manager 203 might determine that there are no migration candidates because the HCI is optimally configured in terms of network cost. Accordingly, if at step 318 the SDDC manager 203 determines that there are no migration candidates, the process can proceed to completion. Otherwise, the process can proceed from step 318 to step 321.

At step 321, the SDDC manager 203 can perform migration of one or more of the migration candidates identified from the analysis of network cost. Migration of a workload 233 to a different host device can be performed by the resource scheduler 209. The resource scheduler 209 can migrate the workload 233 and its respective data, settings, and configuration to a different host 118 on behalf of the SDDC manager 203. Thereafter, the process can proceed to completion.

Figure 4:
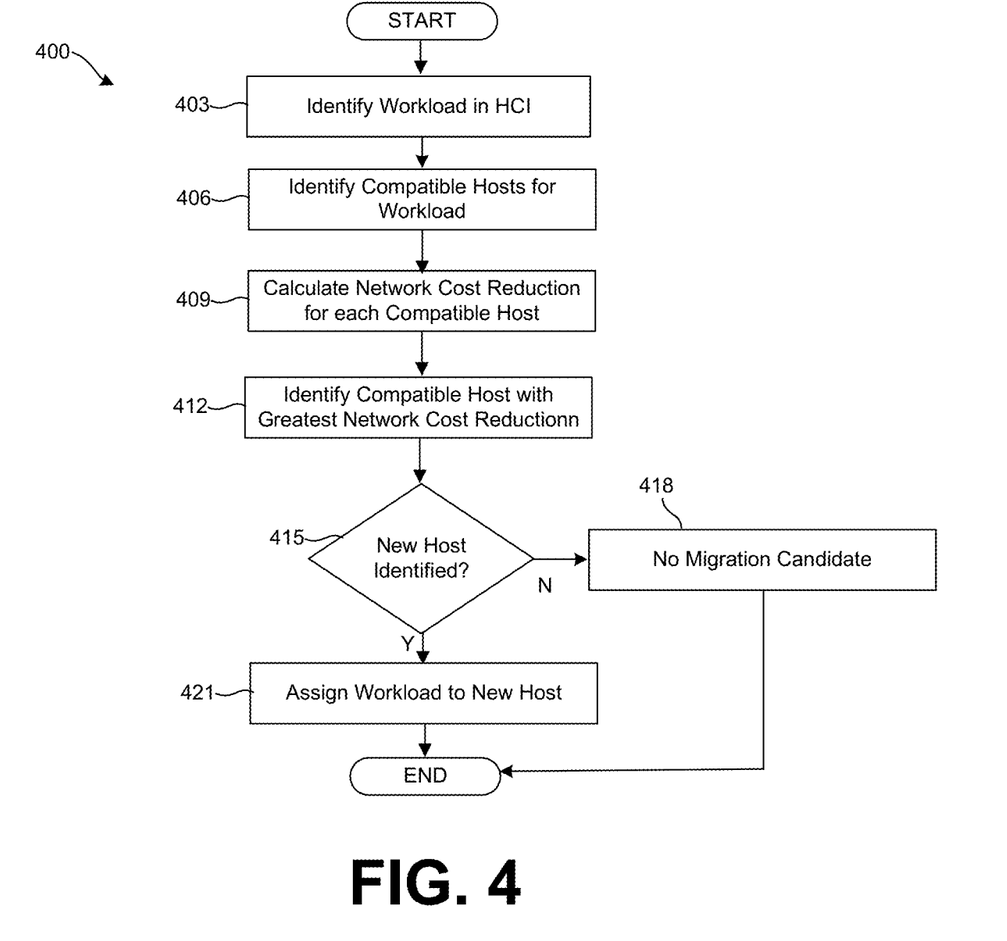

Referring to FIG. 4, shown is an example flowchart 400 describing steps that can be performed by the components of the networked environment 100 of FIG. 1. Generally, the flowchart 400 describes how the management cluster 130 executing the SDDC manager 203 can employ a greedy selection algorithm to determine migration candidates or identify workloads 233 to migrate workloads 233 to alternative hosts 118 to reduce the network cost of the HCI managed by the SDDC manager 203.

The SDDC manager 203 can perform the process illustrated in FIG. 4 on all workloads 233 or a subset of workloads 233 for which the network cost was determined. Iteration based algorithms can select a workload 233 from a workload pair or pairs and determine whether migration of the workload 233 will reduce the network cost of the HCI. In one example, a greedy selection policy can be utilized.

First, at step 403, the SDDC manager 203 can select a workload 233 that is deployed within the HCI. The workload 233 can be one or both of the workloads 233 from a workload pair having the highest network cost. Or, a workload 233 can be selected through another selection process, such as random selection or selection based upon CPU or memory size of the workload 233.

At step 406, the SDDC manager 203 can identify compatible hosts 118 within the HCI to which the workload 233 can be migrated. The compatible hosts 118 can be identified based upon an operating system required by the workload 233, available CPU or memory resources of the host 118 that are required by the workload 233, whether a virtual network switch is also available for execution on the host 118, or another selection criteria.

At step 409, the SDDC manager 203 can calculate a network cost reduction of workload pairs associated with a migration of a workload 233 to a compatible host 118. The network cost reduction can be determined by calculating the network cost of the workload pairs of which the workload 233 is a member and making a comparison with the overall network cost of the previous workload pairs of which the workload 233 was a member.

At step 412, the SDDC manager 203 can identify the compatible host 118 resulting in the greatest network cost reduction for migration of the workload 233. The determination can be made using the same cost function that was utilized to calculate the network cost of the workload pairs. In some cases, there might not be a host 118 that results in a lower network cost for the workload 233.

At step 415, the SDDC manager 203 can determine if a different host 118 than the host 118 on which the workload 233 was previously executing is identified at step 412. If no new host 118 was identified, the process can proceed to step 418. Otherwise, the process can proceed to step 421.

At step 418, the SDDC manager 203 can determine that there is no migration candidate for the workload 233, as migrating the workload will not reduce the network cost of the HCI. Thereafter, the process can proceed to completion.

Conversely, at step 421, the SDDC manager 203 can determine that there is a migration candidate for the workload 233, as migrating the workload will the network cost of the HCI. Thereafter, the process can proceed to completion.

A number of software components are stored in the memory and executable by a processor. In this respect, the term "executable" means a program file that is in a form that can ultimately be run by the processor. Examples of executable programs can be a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the SDDC manager 203 or other applications and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a computer-readable medium can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A method, comprising:

monitoring, by at least one computing device of at least one of a plurality of host devices within a hyper-converged infrastructure, network traffic between a plurality of workloads executed on the plurality of host devices;

identifying, by the at least one computing device, a plurality of pairs of workloads, each pair of workloads comprising two workloads that exchange network traffic with each other;

determining, by the at least one computing device, a respective network cost of each of the pairs of workloads based upon a network distance and a volume of network traffic exchanged between the workloads, wherein a lowest network cost is assigned to pairs of workloads executing on a same host device, a next lowest network cost is assigned to pairs of workloads in communication over a switch, and a highest network cost is assigned to pairs of workloads in communication over a switch and a router;

ranking, by the at least one computing device, the plurality of pairs of workloads according to the determined respective network cost;

identifying, by the at least one computing device, a migration of at least one of the highest cost workloads to reduce the respective network cost using a greedy selection algorithm that, for each of the at least one of the highest cost workloads, iterates through each workload pair to which the at least one of the highest cost workload belongs according to the ranking of the plurality of pairs of workloads and selects a best migration of the at least one of the highest cost workloads by iterating through each host device of the plurality of host devices that is capable or compatible with accepting the at least one of the highest cost workloads to identify a maximum network cost reduction; and migrating, by the at least one computing device, the at least one of the highest cost workloads according to the identified migration.

2. The method of claim 1, wherein monitoring the network traffic between the plurality of workloads further comprises obtaining, from the plurality of host devices, a plurality of Internet Protocol Flow Information Export (IPFIX) reports from a respective plurality of hypervisors executed by the plurality of host devices.

3. The method of claim 2, wherein the IPFIX reports are obtained by a service executed by the at least one computing device, the service storing the IPFIX reports in a data store accessible to the at least one computing device.

4. The method of claim 1, wherein the network distance is based on whether respective workloads in a pair of workloads are executed: by the same host device, by two host devices on a common subnetwork in communication over a switch, or by two host devices on different subnetworks.

5. The method of claim 4, wherein the switch comprises a virtual distributed switch that is shared by the two host devices.

6. The method of claim 1, wherein a workload from the plurality of workloads comprises a virtual machine.

7. The method of claim 1, wherein migrating the at least one of the workloads comprises migrating execution the at least one of the workloads to a different host machine to reduce the respective network cost.

8. The method of claim 7, wherein migrating the at least one of the workloads comprises migrating the at least one of the workloads such that a respective one of the pairs of workloads are executed by the same host machine.

9. The method of claim 7, wherein migrating the at least one of the workloads comprises migrating the at least one of the workloads such that a respective one of the pairs of workloads are executed by host machines in communication on a common subnetwork.

10. A system comprising:
at least one computing device;
an application executed by the at least one computing device, the application causing the at least one computing device to at least:
monitor, by at least one computing device of at least one of a plurality of host devices within a hyper-converged infrastructure, network traffic between a plurality of workloads executed on the plurality of host devices;
identify, by the at least one computing device, a plurality of pairs of workloads, each pair of workloads comprising two workloads that exchange network traffic with each other;
determine, by the at least one computing device, a respective network cost of each of the pairs of workloads based upon a network distance and a volume of network traffic exchanged between the workloads, wherein a lowest network cost is assigned to pairs of workloads executing on a same host device, a next lowest network cost is assigned to pairs of workloads in communication over a switch, and a highest network cost is assigned to pairs of workloads in communication over a switch and a router;
rank, by the at least one computing device, the plurality of pairs of workloads according to the determined respective network cost;
identify, by the at least one computing device, a migration of at least one of the highest cost workloads to reduce the respective network cost using a greedy selection algorithm that, for each of the at least one of the highest cost workloads, iterates through each workload pair to which the at least one of the highest cost workload belongs according to the ranking of the plurality of pairs of workloads and selects a best migration of the at least one of the highest cost workloads by iterating through each host device of the plurality of host devices that is capable or compatible with accepting the at least one of the highest cost workloads to identify a maximum network cost reduction; and
migrate, by the at least one computing device, the at least one of the highest cost workloads according to the identified migration.

11. The system of claim 10, wherein the network distance is based on whether respective workloads in a pair of workloads are executed: by the same host device, by two host devices on a common subnetwork in communication over a switch, or by two host devices on different subnetworks.

12. The system of claim 11, wherein the switch comprises a virtual distributed switch that is shared by the two host devices.

13. The system of claim 10, wherein a workload from the plurality of workloads comprises a virtual machine.

14. The system of claim 13, wherein migrating the at least one of the workloads comprises migrating execution the at least one of the workloads to a different host machine to reduce the respective network cost.

15. The system of claim 10, wherein migrating the at least one of the workloads comprises migrating execution the at least one of the workloads to a different host machine to reduce the respective network cost.

16. A non-transitory computer-readable medium embodying a program executed by at least one computing device, the program causing the at least one computing device to at least:
monitor, by at least one computing device of at least one of a plurality of host devices within a hyper-converged infrastructure, network traffic between a plurality of workloads executed on the plurality of host devices;
identify, by the at least one computing device, a plurality of pairs of workloads, each pair of workloads comprising two workloads that exchange network traffic with each other;
determine, by the at least one computing device, a respective network cost of each of the pairs of workloads based upon a network distance and a volume of network traffic exchanged between the workloads, wherein a lowest network cost is assigned to pairs of workloads executing on a same host device, a next lowest network cost is assigned to pairs of workloads in communication over a switch, and a highest network cost is assigned to pairs of workloads in communication over a switch and a router;
rank, by the at least one computing device, the plurality of pairs of workloads according to the determined respective network cost;
identify, by the at least one computing device, a migration of at least one of the highest cost workloads to reduce the respective network cost using a greedy selection algorithm that, for each of the at least one of the highest cost workloads, iterates through each workload pair to which the at least one of the highest cost workload belongs according to the ranking of the plurality of pairs of workloads and selects a best migration of the at least one of the highest cost workloads by iterating through each host device of the plurality of host devices that is capable or compatible with accepting the at least one of the highest cost workloads to identify a maximum network cost reduction; and
migrate, by the at least one computing device, the at least one of the highest cost workloads according to the identified migration.

17. The non-transitory computer-readable medium of claim 16, wherein the network distance is based on whether respective workloads in a pair of workloads are executed: by the same host device, by two host devices on a common subnetwork in communication over a switch, or by two host devices on different subnetworks.

18. The non-transitory computer-readable medium of claim 17, wherein the switch comprises a virtual distributed switch that is shared by the two host devices.

19. The non-transitory computer-readable medium of claim 16, wherein a workload from the plurality of workloads comprises a virtual machine.

20. The non-transitory computer-readable medium of claim 19, wherein migrating the at least one of the workloads comprises migrating execution the at least one of the workloads to a different host machine to reduce the respective network cost.

21. The non-transitory computer-readable medium of claim 16, wherein migrating the at least one of the workloads comprises migrating execution the at least one of the workloads to a different host machine to reduce the respective network cost.

* * * * *